L. ANDERSON.
AIR VALVE FOR CARBURETERS.
APPLICATION FILED MAY 21, 1910.
1,035,938.
Patented Aug. 20, 1912.
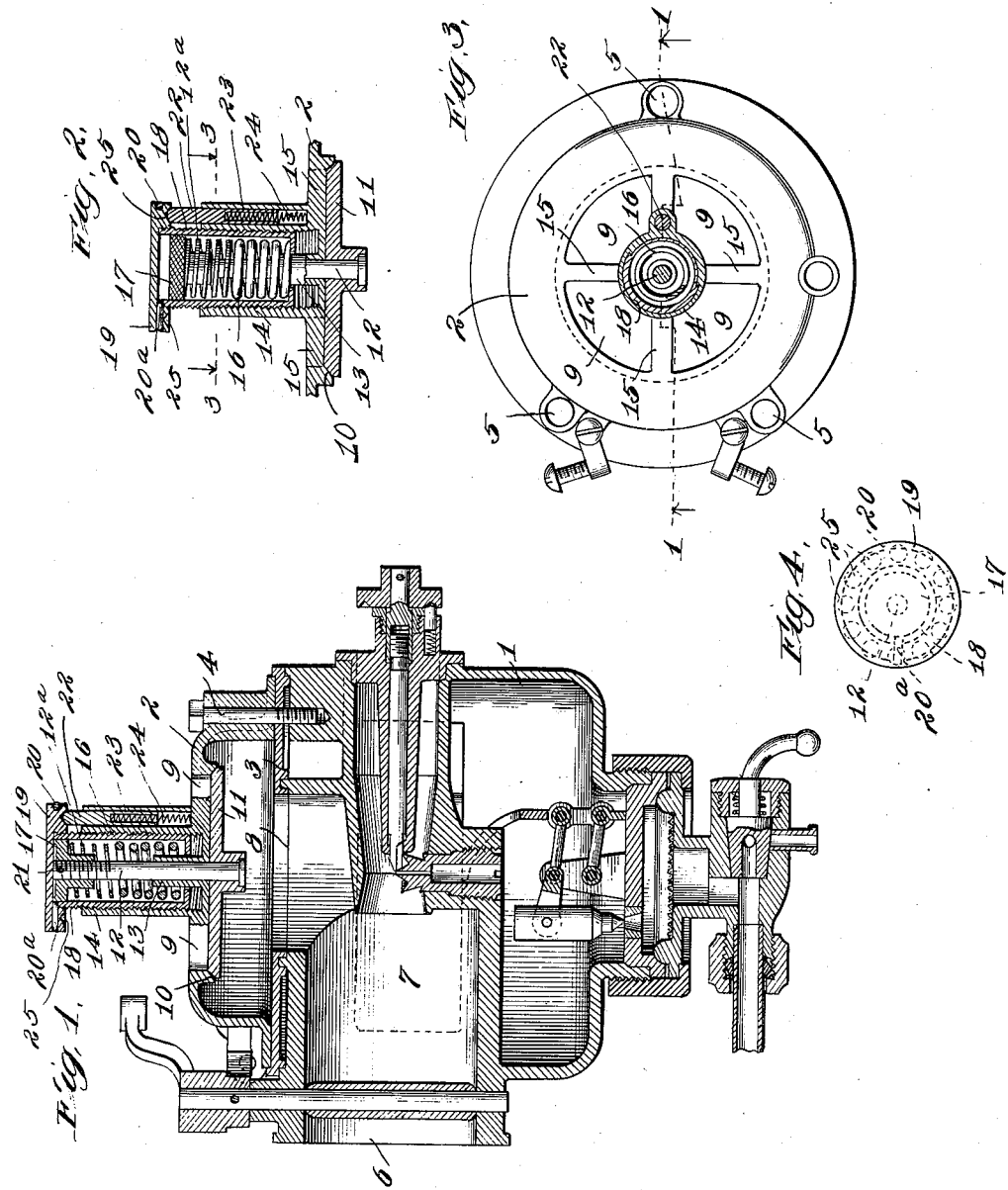

UNITED STATES PATENT OFFICE.

LARS ANDERSON, OF CHICAGO, ILLINOIS.

AIR-VALVE FOR CARBURETERS.

1,035,938.     Specification of Letters Patent.     Patented Aug. 20, 1912.

Application filed May 21, 1910. Serial No. 562,618.

*To all whom it may concern:*

Be it known that I, LARS ANDERSON, a citizen of the United States, residing at Chicago, in the county of Cook and State of Illinois, have invented certain new and useful Improvements in Air-Valves for Carbureters, of which the following is a specification.

The object of this invention is to provide an improved air-inlet valve for carbureters, which may be readily adjusted, wherein any tendency to side movement or binding is obviated, and wherein the valve spring is protected and yet is readily accessible.

In the accompanying drawings, Figure 1 is a vertical central section of a carbureter embodying the features of my invention, the view being taken in the plane of dotted line 1—1 of Fig. 3. Fig. 2 is a detail sectional view of the air valve. Fig. 3 is a section on line 3—3 of Fig. 2. Fig. 4 is a top plan view of an adjusting member.

That embodiment which is herein shown of the invention comprises a casing consisting of a body portion 1 and a dome 2, the body portion forming a float chamber and the dome an air chamber. The float chamber is separated from the air chamber by a partition 3 which is interposed between the body portion and the dome, the whole being secured together by means of screws 4 entering openings 5 in the dome and extending through the partition and into the body portion.

The carbureter is provided with an outlet tube 6 providing means for mounting the carbureter in communication with the inlet pipe of an internal-combustion engine. Within the float chamber is a mixing chamber 7 communicating at one end with the outlet 6 and at its other end with the air chamber through an opening 8 in the partition 3. Arranged in the central portion of the dome 2 are air-inlet openings 9, a valve seat 10 being formed about said openings upon the inner side of the upper wall of the dome. The entrance of air through the openings 9 is controlled by a valve disk 11 adapted to contact the seat 10, said valve disk having a central vertically-extending stem 12 which is slidable in a bearing 13 formed in the lower part of a sleeve 14, said sleeve being carried by arms 15 formed integral with the dome. The downward or opening movement of the valve disk 11 is cushioned by a coiled spring 16 interposed between a nut 17 turned on the upper screw-threaded end of the stem 12 and the end wall of a bushing 18. Said bushing has a screw-thread connection with the sleeve 14, and may be rotated by means of a head or cap 19 to adjust the tension of the spring 16. Said head is in the form of a nut turned on the upper end of the bushing, and may be locked against rotation with reference to the bushing by suitable means, such as a spring clip 20 removably fitting in a groove in said nut, one end 20$^a$ of the clip being bent to extend through registering openings in the nut and the bushing, as shown in Fig. 1. When access to the interior of the bushing is desired, the clip 20 is sprung out of its groove and the end 20$^a$ withdrawn from engagement with the bushing 18 and the cap 19, when the cap may be unscrewed from the bushing. If desired, the nut 17 may be locked upon the stem 12 by means such as a pin or screw 21.

In order to hold the adjusting member 19 in the desired position, I provide a pin 22 slidably mounted in a socket 23 upon the sleeve 14, said pin being yieldingly pressed against the head or cap 19 by a spring 24 inclosed in said socket. The outer end of the pin 22, as herein shown, is rounded so that it may slip into and out of a series of shallow recesses 25 in the head 19.

In order that the valve member 11 may open quite freely, the spring 16 comprises a portion 12$^a$ which is weaker than the remainder of the spring. The first portion of the opening movement of the valve disk is but slightly resisted by the portion 12$^a$ of the spring, but as the opening movement continues the stiffer portion of the spring comes into service.

The air inlet formed by the segmental openings 9 is alined with the opening 8 and with the direction of movement of the valve disk 11. There is consequently no suction tending to move the valve disk laterally and cause it to bind or stick in its bearing 13.

It will be noted that the spring 16 and 12$^a$ is completely inclosed and protected, and that it may readily be adjusted by rotating the head 19.

Certain features of the carbureter herein shown are claimed in applications Serial Nos. 522,710, and 562,619, filed by me on October 15, 1909, and May 21, 1910, respectively.

I claim as my invention:

1. An air valve comprising a valve seat, a valve disk coacting with said seat, supporting means comprising a sleeve having a bearing therein, said disk having a stem which is slidably mounted in said bearing, a projection on said valve stem, a bushing having a screw thread engagement with said sleeve, and a spring within said bushing interposed between the lower end of said bushing and said projection tending to close said valve; a removable non-rotatable cap on the upper end of said sleeve, and an annular projection on the periphery of said cap; said annular projection having indentations therein and a resilient member playing in said indentations.

2. An air valve for carbureters comprising a valve disk, supporting means comprising an imperforate sleeve having a bearing rigidly held therein at its inner end, said disk having a stem which is slidably mounted in said bearing, a bushing having a screw-thread engagement with said sleeve, said bushing having a perforated wall at one end, through which said bearing extends, and a head closing the opposite end of the bushing, a projection on said valve stem within the bushing, and a spring interposed between said projection and the said end wall of the bushing tending to close said valve.

3. The combination of a part having an opening therein, and a valve seat surrounding said opening; a bearing supported by said part and axially alined with said valve seat; a valve disk adapted to close against said seat and having a stem which is slidably mounted in said bearing; an imperforate sleeve rigidly connected with and surrounding said bearing; an adjusting bushing having a perforated bottom and having a screw-thread engagement with said sleeve; and a spring inclosed within said bushing and bearing at one end against said valve stem and at its other end against the perforated bottom of the said bushing to close said valve.

4. An air valve comprising a valve seat, a valve disk adapted to coact with said seat, supporting means comprising a sleeve having a bearing therein, said disk having rigidly attached thereto a stem which is slidably mounted in said bearing, a projection on said valve stem, a bushing having a screw-threaded engagement with said sleeve, and a spring within said bushing, said spring interposed between the inner end of said bushing and said projection tending to close said valve disk against said seat, and an imperforate cap on the outer end of said bushing, and resilient means for preventing rotation of said cap.

5. An air valve for carbureters comprising a valve disk, supporting means comprising an imperforate sleeve having a bearing rigidly held therein at its inner end, said disk having a stem which is slidably mounted in said bearing, a bushing having a screw-thread engagement with said sleeve, said bushing having a perforated wall at one end, through which said bearing extends, and a cap threaded into the opposite end of said bushing, resilient means for preventing rotation of said cap, a projection on said valve stem within the bushing and a spring interposed between said projection and the said end wall of the bushing tending to close said valve.

LARS ANDERSON.

Witnesses:
 J. RAYMOND BARSE,
 GEORGE L. CHINDAHL.